United States Patent
Beller et al.

(10) Patent No.: US 11,577,576 B2
(45) Date of Patent: Feb. 14, 2023

(54) ACTIVE ROLL STABILIZATION WITH IMPROVED CONTROL BY MEANS OF A SET POINT LIMITATION

(71) Applicant: ZF Friedrichshafen AG, Friedrichshafen (DE)

(72) Inventors: Michael Beller, Aitrach (DE); Axel Bolta, Friedrichshafen (DE); Lars-Theodor Thole, Lohne (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 220 days.

(21) Appl. No.: 17/003,235

(22) Filed: Aug. 26, 2020

(65) Prior Publication Data

US 2021/0061048 A1 Mar. 4, 2021

(30) Foreign Application Priority Data

Sep. 3, 2019 (DE) ...................... 10 2019 213 309.6

(51) Int. Cl.
   *B60G 21/055* (2006.01)

(52) U.S. Cl.
   CPC .... *B60G 21/0555* (2013.01); *B60G 2202/135* (2013.01); *B60G 2202/42* (2013.01); *B60G 2204/8306* (2013.01); *B60G 2500/20* (2013.01); *B60G 2600/182* (2013.01); *B60G 2800/012* (2013.01)

(58) Field of Classification Search
   CPC .......... B60G 21/0555; B60G 2202/135; B60G 2202/42; B60G 2204/8306; B60G 2500/20; B60G 2600/09; B60G 2600/182; B60G 2800/012; B60G 17/0162; B60G 2400/90

See application file for complete search history.

(56) References Cited

U.S. PATENT DOCUMENTS

| | | | | |
|---|---|---|---|---|
| 9,333,830 B2* | 5/2016 | Illg | ...................... | B60G 21/055 |
| 2005/0179220 A1* | 8/2005 | Yasui | .................. | B60G 17/0162 280/5.506 |
| 2005/0264247 A1* | 12/2005 | Buma | ................. | B60G 21/0555 318/432 |
| 2006/0116802 A1* | 6/2006 | Yamada | ........... | B60G 17/01908 701/37 |
| 2006/0138732 A1* | 6/2006 | Buma | ................. | B60G 17/0162 280/5.5 |
| 2006/0212199 A1* | 9/2006 | Urababa | ............ | B60G 21/0555 701/38 |

(Continued)

*Primary Examiner* — James A English
*Assistant Examiner* — Scott F. Underwood
(74) *Attorney, Agent, or Firm* — Finch & Maloney PLLC

(57) ABSTRACT

A method for the active roll stabilization of a vehicle (50) by way of a roll stabilizer (30). The roll stabilizer (30) includes a stabilizer rod (32), a stabilizer housing (34) and a stabilizer motor (36), arranged inside the stabilizer housing (34), so that a first end of the stabilizer rod (32) is connected at to a wheel (52) of the vehicle and at a second end thereof is mounted to be rotated by way of the stabilizer motor (36). The method including the steps of obtaining a first set-point value of a rod torque of the stabilizer rod (32); obtaining a second set-point value of a motor rotation angle of the stabilizer motor (36); limiting the second set-point value based on an absolute value and/or a gradient of the first set-point value; and inputting the second set-point value into a control sequence (20) as a guide magnitude.

10 Claims, 1 Drawing Sheet

(56) References Cited

U.S. PATENT DOCUMENTS

| | | | |
|---|---|---|---|
| 2010/0138108 A1* | 6/2010 | Kajino | B60G 17/016 |
| | | | 701/38 |
| 2015/0012177 A1* | 1/2015 | Koch | B60G 17/0162 |
| | | | 701/38 |
| 2015/0094909 A1* | 4/2015 | Illg | B60G 17/0162 |
| | | | 701/37 |
| 2018/0281547 A1* | 10/2018 | Koumura | B60G 17/018 |

* cited by examiner

ACTIVE ROLL STABILIZATION WITH IMPROVED CONTROL BY MEANS OF A SET POINT LIMITATION

This application claims priority from German patent application serial no. 10 2019 213 309.6 filed Sep. 3, 2019.

FIELD OF THE INVENTION

The present invention relates to the field of roll stabilization in vehicles. In particular, the present invention relates to a method, a control device, an active roll stabilizer, a vehicle, a computer program product, a computer-readable medium and a data signal.

BACKGROUND OF THE INVENTION

The stability of a vehicle plays a decisive part where safety and driving comfort are concerned. Particularly in the case of vehicles of tall size categories such as SUVs and buses, when the vehicle drives round a curve it tends to roll because of its high center of gravity. Bumps in the road can also lead to instability.

From the prior art roll stabilizers are known, which comprise a tubular connection between two wheels of the front or rear axle. Into the tubular connection is fitted a motor, which is controlled in such manner as to counteract the rolling of the vehicle by relative rotation between two stabilizer tubes respectively associated with the two wheels. Control of the motor is often based on a regulating method.

In the known roll stabilizers the regulating methods used with them are liable to the disadvantage that there is no guarantee that the synchronous machine built into the roll stabilizer will always operate within a defined working range as regards its motor torque and running speed. For example there is no way of preventing the stabilizer motor from operating with a high motor torque and at a high running speed at one and the same time.

SUMMARY OF THE INVENTION

Accordingly, the purpose of the present invention is to improve the regulating method for a stabilizer and the stabilizer itself, so that the stabilizer motor always operates within the defined working range with regard to its motor torque and running speed.

This objective is achieved by a method, a control device, a roll stabilizer, a vehicle, a computer program product, a computer-readable medium and a data signal as specified in the independent claims.

The roll stabilization method according to the invention uses a roll stabilizer that comprises a stabilizer rod, a stabilizer housing and a stabilizer motor arranged inside the stabilizer housing. The stabilizer rod is connected at a first end to a wheel of the vehicle and at a second end it is mounted so that it can be rotated by means of the stabilizer motor. The stabilizer rod is preferably in the form of a stabilizer tube.

In an embodiment, the roll stabilizer comprises two stabilizer rods which, together, are associated with the front or rear axle of the vehicle and are, respectively, connected to the two wheels of the axle. Preferably, the stabilizer housing is connected on each side to one of the two stabilizer rods. In such a case the stabilizer motor can act as a common rotational drive of the two stabilizer rods. A gear system can be fitted between the stabilizer motor and the stabilizer rod in order to transform the motor rotational speed into the rod rotational speed.

One or more additional components can be built into the roll stabilizer. These additional components can comprise a decoupling element, a coupling bar and/or a stabilizer mount.

During operation of the roll stabilizer, the rotor of the stabilizer motor connected to the motor-side end of the stabilizer rod (for example, by way of the gear system located between them) rotates. Due to this rotary connection, the motor rotational angle of the stabilizer motor and the motor-side rotational angle of the stabilizer rod are equal, with regard to the transmission ratio of the gear system connected between them. Thus, the torque of the motor (motor torque) is transmitted to the stabilizer rod. Due to the rigidity of the stabilizer rod, torsion is produced along the stabilizer rod which can be described by a torsion angle. The torsion angle of the stabilizer rod is obtained, for example, by the difference between the rotational angle of the stabilizer rod on the motor side and the rotational angle of the stabilizer rod on the wheel side.

In the regulating process a first set-point value of the rod torque of the stabilizer rod and a second set-point value of the motor rotational angle of the stabilizer motor are obtained. The first and/or second set-point value can for example be obtained from a control unit of the vehicle, which determines the set-point value concerned on the basis of movement data of the vehicle in order to counteract the rolling of the vehicle.

In doing this, the second set-point value can be determined from the first set-point value. For example, the second set-point value is calculated as the sum of two addenda, a first addendum of which is a rotational angle existing at an end of the stabilizer rod on the wheel side and the second addendum is obtained by dividing the first set-point value by a rigidity of the rod material and multiplying the intermediate result by a gear transmission ratio.

The second set-point value is limited on the basis of the first set-point value. This ensures that the second set-point value does not exceed an upper threshold determined on the basis of the first set-point value.

The second set-point value is introduced as a guide magnitude into a control sequence. By means of the control sequence, the second set-point value is converted into a desired target value for the motor rotational angle in the stabilizer motor, so that the actual value of the motor rotational angle approaches as closely as possible to the second set-point value determined. As explained in greater detail below, the second set-point value can be entered into the control sequence after being limited. Alternatively, the second set-point value can be limited in the control sequence only after it has been entered into the latter.

By limiting the second set-point value, it can be avoided, or the probability reduced, that when the rod torque is large, a high running speed of the stabilizer motor will be called for at the same time. This reduces the risk that the stabilizer motor, particularly a permanently energized synchronous machine built into it, will move outside a defined, regular working range, which would lead to an unstable position regulation of the stabilizer and along with that to a "breakaway" or failure of the active roll support.

Advantageous design features and further developments are indicated in the subordinate claims.

According to one embodiment, to limit the change of the second set-point value it is compared with a predefined threshold, and the change of the second set-point value obtained is replaced by the predefined threshold if the change of the second set-point value obtained is greater than the predefined threshold.

Preferably the second set-point value obtained remains unchanged if it is equal to or smaller than the predefined threshold. This measure enables particularly effective and controllable limitation of the motor rotational angle or the motor rotational speed.

According to a further embodiment, the predefined threshold is determined from a relationship between a motor torque of the stabilizer motor and the motor rotational speed, the relationship being obtained from a characterization of the stabilizer motor.

The relationship is given, for example, by a motor characteristic in which the motor torque is obtained as a function of the motor rotational speed. Preferably the function is embodied in the form of a Cartesian co-ordinate diagram or a table. Alternatively, the relationship is obtained from an inverted motor characteristic containing a reverse function of the above function. Since the motor characteristic of the stabilizer motor is readily available, the above-mentioned relationship can be obtained in a simple manner. The method according to the invention therefore entails little effort.

According to a further embodiment, the method further involves determining a motor rotational speed from the relationship associated with that motor torque which corresponds to the first set-point value as the predefined threshold.

Thus, first the first set-point value is adopted as the value for the motor torque, and in accordance with the above relationship the associated motor rotational speed is determined. This enables a precise determination of the predefined threshold, so that the limitation of the second set-point value is particularly effective. The positional stability of the stabilizer is increased thereby.

According to a further embodiment the limited second set-point value is entered as a guide magnitude into the control sequence.

This measure has the advantage that the restriction/limitation of the motor rotational angle or motor rotational speed takes place already at an early stage in the control chain, so that a greater robustness of the position regulation of the stabilizer can be achieved. In this case limiting of the second set-point value should be understood to mean both the case in which the second set-point value obtained is itself limited before being entered in the control sequence, and also the case when an intermediate magnitude derived from the second set-point value obtained, such as the gradient of the motor rotational angle or the rotational speed of the stabilizer motor, is limited.

According to a further embodiment the second set-point value is limited in the control sequence after it has been entered in the latter.

In this case limiting of the second set-point value is understood to mean both the case when the second set-point value entered is itself limited directly in the control sequence, and also the case when an intermediate magnitude derived from the second set-point value entered is limited.

BRIEF DESCRIPTION OF THE DRAWINGS

Embodiments will now be described as examples with reference to the attached figures, which show.

DETAILED DESCRIPTION OF THE PREFERRED EMBODIMENTS

In the figures, the same indexes denote the same or functionally similar reference components. In the individual figures, the reference components which are relevant in each case are indexed.

Figure 1:
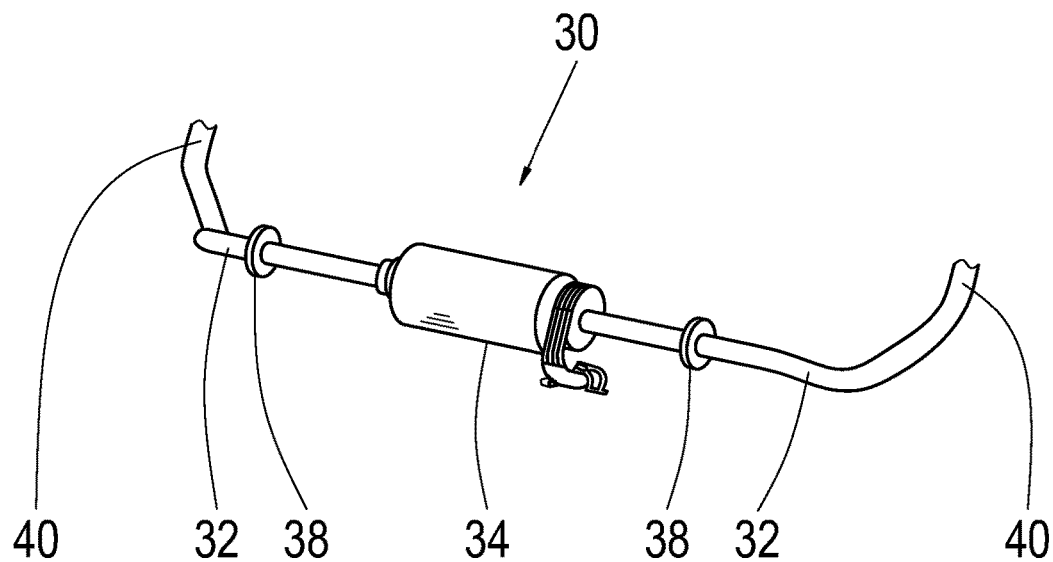
FIG. 1: A schematic representation of an embodiment of a roll stabilizer.
Figure 3:
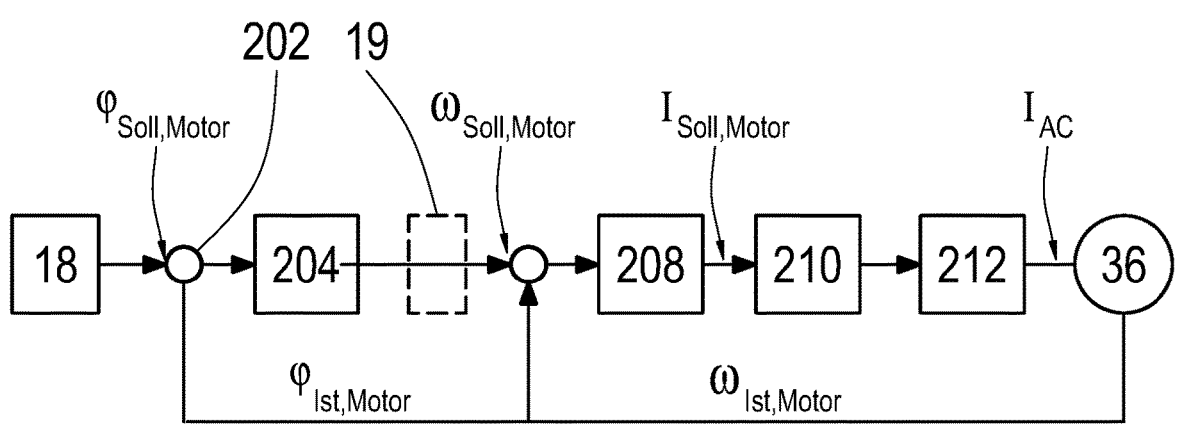
FIG. 3: A schematic representation of an embodiment of a control sequence.

FIG. 1 shows a schematic representation of an active roll stabilizer 30, in particular an active electro-mechanical roll stabilizer. The roll stabilizer 30 comprises two stabilizer rods 32, preferably in tubular form. The two stabilizer rods 32 can in each case be connected at their respective outer ends to a wheel 52 of a vehicle 50 at respective attachment points 40 (FIGS. 3-4). At an inner end the stabilizer rods 32 are connected to a stabilizer motor 36 (see FIG. 3) of the roll stabilizer 30, the stabilizer motor 36 being accommodated in a stabilizer housing 34. To fix the roll stabilizer 30, two stabilizer mounts 38 are also provided.

Figure 2:
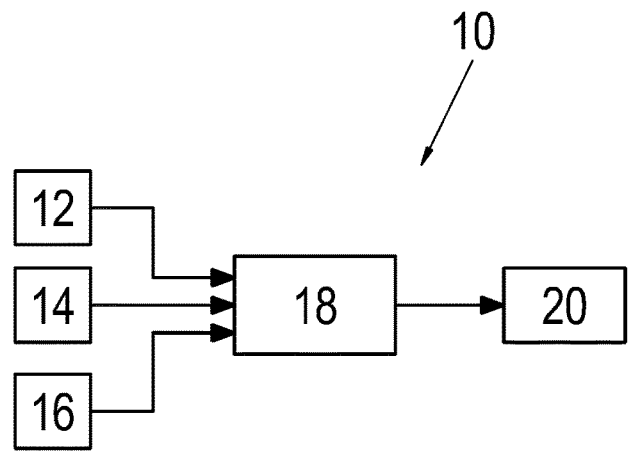
FIG. 2: A schematic representation of an embodiment of a regulating device.

The roll stabilizer 30 further comprises a regulating device 10. The regulating device 10 preferably serves to determine a set-point value of the rotational angle for the stabilizer motor 36 and to produce that set-point value in the stabilizer motor 36 by means of a regulating process. FIG. 2 shows a schematic representation of the regulating device 10. The regulating device 10 comprises a first signal input 12 for receiving a first set-point value of a rod torque of the stabilizer rod 32 which is to be driven by the stabilizer motor 36. Further, the regulating device 10 comprises a second signal input 14 for receiving a second set-point value of a motor rotational angle of the stabilizer motor 36. As already explained earlier, the second set-point value can be determined on the basis of the first set-point value. Furthermore the regulating device 10 comprises a third signal input 16 for receiving a predetermined relationship between a motor torque and a motor rotational speed. The predetermined relationship can be obtained from a characterization of the stabilizer motor 36. Preferably, the predetermined relationship can be obtained from a motor characteristic, as already explained earlier.

The regulating device 10 also comprises a limiting unit 18 by means of which the second set-point value is restricted/limited on the basis of the first set-point value. For example, the limiting unit 18 determines from the predetermined relationship received a motor rotational speed which is associated with a motor torque such that the motor torque has the value of the first set-point of the rod torque. This motor rotational speed is used as the permitted maximum, in order to limit the second set-point value received. Preferably, the maximum is further processed as the limited second set-point value and entered in a control sequence 20 of the regulating device 10 as a guide magnitude if the second set-point value is larger than or equal to the maximum. Otherwise, the second set-point value received is process further without change and entered into the control sequence 20.

FIG. 3 shows a schematic representation of an example of a control sequence 20. According to one embodiment, the second set-point value of the motor rotational angle $\varphi_{Soll,Motor}$, limited as described above, is fed into a first comparator 202. At the same time, an actual value of the motor rotational angle, $\varphi_{1st,Motor}$ is fed into the first comparator 202. The first comparator 202 compares the two magnitudes fed into it and, if a difference between them that exceeds a predefined threshold is detected, the comparator passes the second set-point value on to a position regulating unit 204. The position regulating unit 204, which can comprise the first comparator 202, determines from the limited second set-point value $\varphi_{Soll,Motor}$ a third set-point value of a motor rotational speed, $\omega_{Soll,Motor}$. A second comparator 206 compares the third set-point value with an actual value of the motor rotational speed, $\omega_{1st,Motor}$ obtained from the stabilizer motor 36, and passes the third actual value to a rotational speed regulating unit 208 if a difference between the magnitudes compared exceeds a further predefined threshold. From the third set-point value $\omega_{Soll,Motor}$ the rotational speed regulating unit 208 determines a fourth set-point value of the motor torque, $I_{Soll,Motor}$, and passes this on to a torque regulating unit 210. The torque regulating unit 210 determines several, preferably three current intensities from the fourth set-point value and passes these on to a DC-AC converter (inverter) 212. On the basis of the current intensities provided, the inverter 212 produces a multi-phase, preferably three-phase alternating current $I_{AC}$ and feeds this into the stabilizer motor 36.

In an alternative embodiment, limiting of the second set-point value takes place not before the control sequence 20, but within it. As represented in FIG. 3 by broken lines, the limiting unit 19 can be arranged between the position regulating unit 204 and the rotational speed regulating unit 206 instead of before the first comparator 202. In this case, instead of a limited second set-point value of the motor rotational angle, a non-limited second set-point value is fed into the first comparator 202. The limiting unit 19 receives as input a set-point value of the motor rotational speed, $\omega_{Soll,Motor}$, from the rotational speed regulating unit 206 and emits as output a limited set-point value of the motor rotational speed. In this embodiment, therefore, a motor rotational speed derived from the second set-point value is limited.

INDEXES

10 Regulating device
12 First signal input
14 Second signal input
16 Third signal input
18, 19 Limiting unit
20 Control sequence
202 First comparator
204 Position regulating unit
206 Second comparator
208 Rotational speed regulating unit
210 Torque regulating unit
212 Inverter
30 Active roll stabilizer
32 Stabilizer rod
34 Stabilizer housing
36 Stabilizer motor/Stabilizer actor
38 Stabilizer mount
40 Fixing point/coupling bar

The invention claimed is:

1. A method for active roll stabilization of a vehicle by a roll stabilizer that has a stabilizer rod, a stabilizer housing and a stabilizer motor, arranged inside the stabilizer housing, a first end of the stabilizer rod is connected to a wheel of the vehicle and a second end thereof is mounted to be rotated by the stabilizer motor, the method comprising:

obtaining a first set-point value of a rod torque of the stabilizer rod;
obtaining a second set-point value of a motor rotation angle of the stabilizer motor;
limiting the second set-point value based on at least one of an absolute value and a gradient of the first set-point value;
inputting the second set-point value into a control sequence as a guide magnitude; and
limiting the second set-point value by comparing the second set-point value to a predefined threshold, and replacing the second set-point value with the predefined threshold when the second set-point value obtained exceeds the predefined threshold.

2. The method according to claim 1, further comprising determining the predefined threshold from a relationship between a motor torque of the stabilizer motor and a motor rotational speed, obtained from a characterization of the stabilizer motor.

3. The method according to claim 1, further comprising entering the limited second set-point value into the control sequence as the guide magnitude.

4. A regulating device for active roll stabilization of a vehicle by an active roll stabilizer, wherein the regulating device is designed to carry out the method according to claim 1.

5. An active roll stabilizer comprising a stabilizer rod, a stabilizer housing and a stabilizer motor, arranged inside the stabilizer housing, such that a first end of the stabilizer rod is connected to a wheel of the vehicle and a second end the stabilizer rod is mounted to be rotated by the stabilizer motor, and the roll stabilizer further comprising a regulating device according to claim 4.

6. A vehicle comprising an active roll stabilizer according to claim 5, wherein the active roll stabilizer is connected to at least one wheel of the vehicle.

7. A computer program product comprising commands which, when the program is carried out by a computer, enable the computer to carry out the method according to claim 1.

8. A computer-readable storage medium, on which the computer program product according to claim 7 is stored.

9. A data carrier signal which transmits the computer program product according to claim 7.

10. A method for active roll stabilization of a vehicle by a roll stabilizer that has a stabilizer rod, a stabilizer housing and a stabilizer motor, arranged inside the stabilizer housing, a first end of the stabilizer rod is connected to a wheel of the vehicle and a second end thereof is mounted to be rotated by the stabilizer motor, the method comprising:

obtaining a first set-point value of a rod torque of the stabilizer rod;
obtaining a second set-point value of a motor rotation angle of the stabilizer motor;
limiting the second set-point value based on at least one of an absolute value and a gradient of the first set-point value;
inputting the second set-point value into a control sequence as a guide magnitude; and
limiting the second set-point value in the control sequence after the second set-point value is entered into the control sequence.

* * * * *